United States Patent
Rosen

(10) Patent No.: US 6,841,710 B2
(45) Date of Patent: Jan. 11, 2005

(54) INSTANT DEGRADATION OF PLASTICS INTO SOLUBLE NON-TOXIC PRODUCTS

(76) Inventor: Oren Rosen, 14/1 Moshe Koll Street, Jerusalem 93715 (IL)

( * ) Notice: Subject to any disclaimer, the term of this patent is extended or adjusted under 35 U.S.C. 154(b) by 0 days.

(21) Appl. No.: 10/244,645

(22) Filed: Aug. 21, 2003

(65) Prior Publication Data

US 2004/0064005 A1 Apr. 1, 2004

Related U.S. Application Data

(63) Continuation-in-part of application No. 09/779,056, filed on Feb. 2, 2001, now abandoned.

(51) Int. Cl.⁷ .................................................. C07C 4/06
(52) U.S. Cl. ...................................... 585/241; 585/240
(58) Field of Search ................................. 585/241, 240

(56) References Cited

U.S. PATENT DOCUMENTS 5,770,632 A * 6/1998 Sekhar et al. .............. 521/41.5

* cited by examiner

*Primary Examiner*—Thuan D. Dang
(74) *Attorney, Agent, or Firm*—Rashida A. Karmali

(57) ABSTRACT

The present invention describes novel, cost-effective and rapid processes suitable for recycling and degradation of specially designed plastics, which are instantly degradable synthetic polymeric plastics having the characteristics and properties of conventional forms of plastics. These novel plastic products are made from a variety of compositions of polymers and their compatible nontoxic modifiers. The resulting novel instant degradable plastic products retain latent solubility properties which are triggered upon mild chemical processes of the present invention, thus enabling cost effective and facile recycling of plastic refuge.

2 Claims, No Drawings

INSTANT DEGRADATION OF PLASTICS INTO SOLUBLE NON-TOXIC PRODUCTS

CROSS-REFERENCE TO OTHER APPLICATIONS

This application is a continuation-in-part of U.S. application Ser. No. 09/779,056, filed on Feb. 2, 2001, now abandoned.

1. FIELD OF INVENTION

This invention relates to novel processes for instant, rapid and cost-effective degradation for polymerized plastic products, refuge and plastics for facturing the chemical bonds in said plastics and producing a variety of monomers and degradation products in general, to soluble non-toxic products, using mild chemical conditions. Specifically, the present invention provides a cost effective and easy way to prepare degradable compositions of plastics and other polymers containing the amino-sulfenyl, the oxygen-sulfenyl or the disulphide moieties, and to develop processes suitable for the production and recycling of these products.

2. BACKGROUND OF THE INVENTION

Plastics and other polymers are in theory recyclable, but after a relatively short functional life, are destined to arrive as a significant component of trash. Most of these plastics and other polymers disposed of in landfills are chemically stable and degrade minimally.

This is an increasing problem of plastic pollution in the environment, while the demand for plastics keeps on increasing in most consumer products. Furthermore, the availability of landfill space is diminishing, while there is a worldwide trend toward more stringent regulatory requirements on landfills. Some research and commercial efforts have been directed toward the development of new uses for polymerized products such as scrap, waste tires or rubber. However, because of the high costs associated with the use of plastics this approach has not gained wide acceptance. It is therefore necessary to develop alternative pathways for production of a new class of plastics and a considerable amount of attention has been devoted towards recycling and reclaiming plastics and other polymers.

There are two broad groups of polymers and copolymers classified according to their polymerization: a) condensation polymers, for example polyesters, nylon or polycarbonates, and polyurethane having a polymerized form with a lower molecular weight than the sum of monomers used to make them, and b) chain growth or addition polymers, such as polyethylene and polypropylene have the same molecular weight as the sum of the monomers used to make them, and are made in specific conditions of temperature and pressure and in the presence of a catalyst. Importantly, the instant degradation processes of the present invention can be applied to thermoplastic as well as thermoset polymers such as: polyurethanes, unsaturated polyesters, or epoxy resins, by incorporating the latent sulfide bonds into thermoplastic and thermoset resins. Thermoset as defined herein, is a three dimensional bonded resin molecule which is insoluble under routine degradation conditions. It is possible to solubilize the resins in defined aqueous conditions described herein for degrading and recycling the polymers.

Polymers are generally broken down by two ways: pyrolysis and depolymerization. Pyrolysis requires high temperature conditions known as thermal cracking, a process in which polymer molecules are heated until they fragment into several smaller and randomized-sized molecules, for example, a mixture of alcohols or hydrocarbons, none of which is an original monomer.

Depolymerization is carried out at significantly milder thermal conditions than those employed in pyrolysis and prior art teaches several hydrolytic methods, for example, glycolysis, methanolysis or hydrolysis, based on the depolarization reagent used, such as glycol, methanol, or water respectively, wherein under specific conditions of usually high temperature and pressure, with or without a catalyst, the polymer chain separates into its original monomers.

A number of compounds with carbon-carbon double bonds are used in the preparation of polymers. Alkenes of the type $CH_2=CH-X$ are used to form polymers of the type

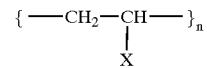

as shown below in Table A.

| A. Alkenes of the type $CH_2=CH-X$ used to form polymers of the type 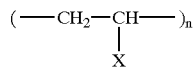 | | | |
|---|---|---|---|
| Compound | Structure | —X in polymer | Application |
| Ethylene | $CH_2=CH_2$ | —H | Polyethylene films as packaging material; "plastic" squeeze bottles are molded from high-density polyethylene. |
| Propene | $CH_2=CH-CH_3$ | $-CH_3$ | Polypropylene fibers for use in carpets and automobile tires; consumer items (luggage, appliances, etc.); packaging material. |
| Styrene | $CH_2=CH-C_6H_5$ | | Polystyrene packaging, housewares, luggage, radio and television cabinets. |

-continued

| Vinyl chloride | $CH_2=CH-Cl$ | $-Cl$ | Poly(vinyl chloride) (PVC) has replaced leather in many of its applications; PVC tubes and pipes are often used in place of copper. |
| --- | --- | --- | --- |
| Acrylonitrile | $CH_2=CH-C\equiv N$ | $-C\equiv N$ | Wool substitute in sweaters, blankets, etc. |

Alkenes of the type $CH2=Cx2$ are used to form polymers of the type $(-CH_2-CX_2-)_n$ as shown below in Table B.

| B. Alkenes of the type $CH_2=CX_2$ used to form polymers of the type $(-CH_2-CX_2-)_n$ | | | |
| --- | --- | --- | --- |
| Compound | Structure | X in polymer | Application |
| 1,1-Dichloroethene (vinylidene chloride) | $CH_2=CCl_2$ | Cl | Saran used as air- and water-tight packaging film |
| 2-Methylpropene | $CH_2=C(CH_3)_3$ | $CH_3$ | Polyisobutene is component of "butyl rubber", one of earliest synthetic rubber substitutes. |

Other chemical structures may also be used to form polymers as shown below in Table C.

| C. Others | | | |
| --- | --- | --- | --- |
| Compound | Structure | Polymer | Application |
| Tetrafluoroethene | $CF_3=CF_3$ | $(-CF_2-CF_2-)_n$ (Teflon) | Nonstick coating for cooking utensils; bearings, gaskets, and fittings. |
| Methyl methacrylate | $CH_2=\underset{CH_3}{\overset{CO_2CH_3}{C}}$ | $(-CH_2-\underset{CH_3}{\overset{CO_2CH_3}{C}}-)_n$ | When cast in sheets, is transparent; used as glass substitutes (Lucite, Plexiglass). |
| 2-Methyl-1,3-butadiene | $CH_2=\underset{CH_3}{\overset{}{C}}CH=CH_2$ | $(-CH_2C=\underset{CH_3}{\overset{}{C}}-CH-CH_2-)_n$ (Polyisoprene) | Synthetic rubber. |

Source R. C. Atkins and F. A. Carey, Organic Chemistry: A Brief Course, McGraw-Hill, New York, 1990, p. 132.

Generally fifty percent or over, of the manufactured polymers are used as packaging materials and about ninety percent of this flow finishes as a component of ecological garbage. Much effort has been put into developing synthetic polymers intended for packaging, which are capable of being broken down chemically and physically by environmental actions or by biological processes. Such polymers are described as biodegradable.

Biodegradability can be defined as the degradation at the molecular level of substances by the action of enzymes derived from the metabolic processes of microorganisms. The synthetic polymers may also be collected in a reservoir containing bioactive bacteria and microbes, which degrade the plastics to environmentally non-toxic degradation products. However, problems exist in the recycling and purification of monomer degradation products because these products may not be reincorporated into plastics in a cost-effective process. Moreover, the degradation process is time consuming and bio-hazardous, and often results in accumulation of heaps of biohazardous garbage.

Some polymers are known to degrade by hydrolysis in the presence of water and thereby decompose to smaller chemical units. Some of these polymers are also biodegradable, such as polylactic acid and polyglycolic. Due to the expense and difficultly in preparing these hydrolytically degradable polymers, their use has been largely confined to high cost medical applications where bioabsorbable materials are required.

The object of the present invention is to provide a cost effective and easy to prepare degradable compositions of plastics and other polymers containing the amino-sulfenyl (=—NH—S—), the oxygen sulfenyl (=—O—S—), the disulfide (=—S—S—) moieties, and ways to develop processes for their production and to enable these compositions to be used as instantly degradable plastics. It is also the object of the present invention to develop processes useful to carry out instant degradation of plastic disulfides so that these compositions may be used as instantly degradable plastics.

3. SUMMARY OF INVENTION

The present invention is directed towards processes of degradation for a variety of degradable plastic products, which, are made of instantly degradable materials. Specifically the degradable materials are non-toxic, and hydrolytically degradable polymers produced by reacting a monomer with a non-toxic modifier or inert disulphide bond. The modifier is compatible with existing polymer and is non-volatile and nontoxic. The various materials of the present invention include films, molded products, laminates, foams, powders, nonwovens, adhesives, and coatings. The degradation processes of the present invention breakdown the degradable polymers of the plastic materials which are typically, hydrolytically degradable, and/or are degradable under reducing conditions, because of the presence of latent disulfide functional groups of the polymer. The modifier is nonvolatile and typically has a vapor pressure of less than about 158–163° C./3.5 mm Hg Torr at 180° and a boiling temperature above about 280° at 1 atmosphere. Importantly, the instant degradation can be applied to thermoplastic as well as thermoset polymers including, but not limited to, polyurethanes, unsaturated polyesters or epoxy resins. By incorporating the latent disulplide bonds into the thermoplastic and thermoset resins, it is possible to solubilize, under defined conditions, and aqueous conditions these highly insoluble polymeric resins for further recycling processes.

The degradable processes of the present invention are useful for the disposal and recycling of plastics produced for commercial and consumer products. Such products include, but are not limited to, products for controlled release of chemicals, oral drug delivery products, automobile products, gardening products, consumer products, health products, substrates that are suitable for the attachment and growth of living cells, construction products, adhesive products, absorbent articles, flammable products, lubricants, bags, netting, rope, coatings, filters, containers, packaging, clothing, and paper goods. The degradation processes of the present invention degradable materials of a related invention (covered in a different U.S. application and filed at the same time), are particularly useful for the recycling of frequently littered products such as, drink containers, labels, food packaging, printed matter, construction material and vehicle supplies.

The present invention is also directed towards processes for making the various degradable materials of the present invention. The process includes forming a composition, which includes a nontoxic hydrolytically degradable polymer and a nontoxic modifier, wherein the modifier is compatible with the polymer, into various materials useful in plastic products, under conditions such that the modifier is substantially nonvolatile and nonfugitive.

The principal objectives of this invention are 1) to provide processing or recycling methods for substituted disulfide plastic products which have comparable utility to currently produced various types of plastics, and have the advantage over the latter because of the ease with which they can be degraded using appropriate machinery and plant structures, and 2) to provide an environmentally acceptable and economically feasible process, whereby the monomeric units and/or their other useful degradation product units, from which plastics are made can be recovered for environmentally beneficial and commercially profitable applications and reuse.

A further objective is to apply depolymerization technology to cause the polymer molecules to break down into molecules from which they were made, i.e., monomeric units and non-toxic modifiers with an inert disulphide bond.

An additional objective is to simplify and improve the process and the final plastic product recovery, by adding a step for removing interfering complex chemical additives from the plastic products, and by optimizing the reaction conditions for the fracturing of the chemical bonds within the polymer.

An additional objective of this invention is to provide a useful and cost effective solution for new machinery necessary, in the application of the processes of the present invention, by employing comparable and compatible hardware and procedures to those used in current industry practice. The main technological difference between the existing processes and the newly proposed processes of the present invention, is in the introduction of new chemical monomer formulations which sustain the defined instant-degradability properties defined in this invention, while retaining the useful mechanical properties of plastics for commercial applications. This may facilitate the introduction of the invention industry-wide at economically attractive terms, while remaining environmentally friendly.

An additional objective of this invention is to overcome problems of scaling, and to satisfy production capacity requirements by employing up to two or more moderately sized depolymerization reactors operating simultaneously under similar process conditions.

Another objective of this invention is to provide a process whereby the reclamation of waste polymers does not contribute pollutants to the atmosphere as do some other procedures currently used in burning tires to produce energy.

It is also an objective to recover and preserve monomers and other chemicals for reuse instead of destroying them.

Another objective of this invention is to provide a process, which will provide reusable monomers at a cost lower than the cost of manufacturing fresh plastic monomers from crude oil and natural gas.

These and other objectives of this invention are accomplished, in broad aspect, by the synthesis of disulphide derivatives of plastic products in general, and by the simple degradation of these plastic products in environmentally friendly conditions.

4. DETAILED DESCRIPTION OF THE INVENTION

Additional objects, features and advantages of the present invention will become apparent by referring to the following description of the invention in connection with the accompanying drawings.

The invention is directed to processes of degradation and recycling of a variety of degradable plastic products, which contain the amino-sulfenyl, oxygen-sulfenyl and disulphide forms, and are instantly degradable. The basic processes for the degradation of the plastic products are for the most part identical. In some instances such as in polystyrene, a different chemical system is used to achieve the catalytic instant-degradation quality described in the present invention, in order to accomplish the general objectives of the present invention. Thus, although waste plastics can be degraded according to the present invention, for simplicity reference is only made to the processing of used plastics, including, but not limited to, nylons, polyurethanes, polyesters, polyamides, pharmaceutics or polystyrenes. However, the technology applies generally to polymeric plastic substances and to their applications.

The modifier is compatible with the polymer and is nonvolatile and nonfugitive. The various processes described in the present invention are suitable for recycling materials of the present instant-degradable polymers which include films, molded products, laminates, foams, powders, non-wovens, adhesives and coatings. The instant-degradable materials of the present invention are useful for the production of commercial and consumer products. Such products include, but are not limited to, products for controlled release of chemicals, oral drug delivery products, automobile products, gardening products, consumer products, health products, substrates that are suitable for the attachment and growth of living cells, construction products, adhesive products, absorbent articles, flammable products, lubricants, bags, netting, rope, filters, inks, containers, packaging, drink containers, labels, food packaging, pharmaceutics and construction supplies.

The present invention is also directed towards processes for making the various degradable materials of the present invention. These synthetic processes include the preparation of a variety of monomeric and polymeric units of plastics. The processes include forming a predetermined, predesigned composition which includes a nontoxic, hydrolytically degradable polymer with the desired mechanical and commercial specifications, and a nontoxic modifier, wherein the modifier is compatible with the polymer, into the various materials of the present invention under conditions such that the modifier is substantially nonvolatile and nonfugitive.

As used herein, "degradable" with reference to the various materials of the present invention refers to a material including a degradable polymer as described below. The term "degradable" with reference to the polymer, refers to a polymer having a polymer molecular structure which can decompose to smaller molecules. As discussed below, the degradable polymer can be hydrolytically degradable in which water reacts with the polymer to form two or more molecules from the polymer. The degradable polymer can be degraded by a reduction process. For example, non-toxic reducing thiols can be used to cleave latent disulphide bonds in the above mentioned family of instant-degradable polymers, in order to induce the catalytic disassembly and dissolution of plastic product into aqueous solution.

The degradable polymers of the present invention further can be processed within a time frame in which products made from the materials, after use, can either be readily recycled by decomposition of the polymer into monomeric units or, if disposed of in the environment, such as in landfills, the polymer degrades quickly enough to avoid significant accumulation which is significantly less than that of similar products which are not degradable. The process of the present invention degrade the specially designed plastics instantly or in a time period of a few months, whereas similar mass-produced, nondegradable products require typically, decades to centuries.

Reducing agents used in the present invention for the degradation of target polymers include, but are not limited to, 2-mercaptobenzimidazole, 2-mercapto-5-benzimidazole sulfonic acid sodium salt dihydrate; 2-mercaptobenzoic acid or thiosalicylic acid; 3-mercaptobenzoic acid; 4-mercaptobenzoic acid; 2-mercaptobenzothiazole; 2-mercaptobenzooxazole; 2-mercaptoethanesulfonic acid sodium salt; 2-mercaptoethyl trimethyl ammonium bromide acetate; 2-mercaptoethyl trimethyl ammonium iodide acetate; 2-mercaptoimidazole; 8-mercaptomenthone; 2-mercapto-5-methylbenzimidazole; 2-mercapto-1-methylimidazole; 5-mercapto-1-methyltetrazole; 2-mercapto-5-methyl, 1,3,4-thiadiazole; 3-mercapto-4-methyl-4-H-1,2,4 triazole; 3 mercaptopropanediol; 3-mercapto-1-propane sulfonic acid sodium salt; 3-mercaptopropionic acid; n-2-mercaptopropionyl glycite; meraptosuccinic acid; 2-mercaptoacetic acid; cysteine, glutathione and other cysteine containing peptides, sodium borohydride; or sodium cyano borohydride; mercaptopyruvic acid sodium salt.

Reducing agents having the thiol group or mercapto compounds in general, can be incorporated into polyionic, non-toxic bimolecules in order to retain the specified reducing conditions for instant-degradable polymers on the one hand, while enabling non-toxic disposal and handling of the polymeric degradation products, for example

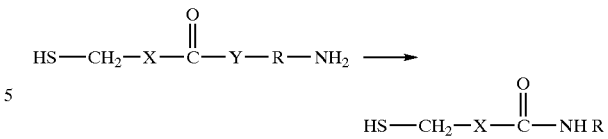

Where x=1, n; Y=activating group, R=peptide, sugar, other molecules.

The thiolic reducing agents include, but are not limited to, 6-mercaptoguanosine, 8-mercaptoguanosine; 2(R)-2-mercaptomethyl-4-methylpentanoyl-β-(-2naphthyl)-ala-ala-amide; (2R)-2-mercaptomethyl-4-methylpentanoyl-phe-ala-amide; N-(2-mercaptopropionyl)-glycine; 2-mercaptopurine; 6-mercaptopurine; 6-mercaptopurine-2'-deoxy-riboside; 6 mercaptopurine riboside; B-mercaptovaline. Generally, the mercapto compounds can be incorporated into polyionic (non-toxic) biomolecules to retain reducing conditions and to enable non-toxic disposal and handling of the polymerics products.

The degradation characteristics of the polymer in the present materials depend in large part on the type of material being made with the polymer. Thus, the polymer needs to have suitable degradation characteristics so that when produced into a final material, the material does not undergo significant degradation until after the useful life of the material. Therefore, different embodiments of the present invention will have different degradation characteristics.

Monomer precursors for incorporating latent disulphide nuclei in the instant degradable polymers of the present invention include, but are not limited to,

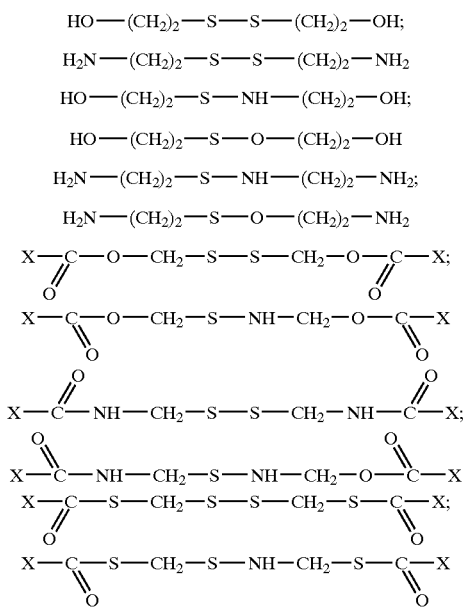

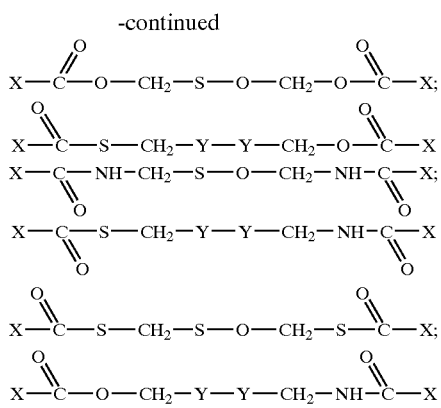

X; where Y—Y=—S—NH; —O—S—; or 2,2'-Dithiosalicylic acid and its derivatives. These types of sulfur-oxygen, sulfur-nitrogen bonds undergo thiolytic degradation and are incorporated as latent nuclei in the instant degradable polymeric plastics. The general feature is represented as:

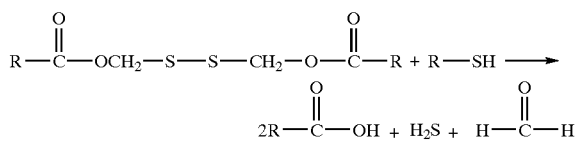

This type of degradation in the family of S—NH, S—O, aid S—S groups occur to facilitate the instant degradation of the plastics with corresponding families of plastics. The general scheme is: O

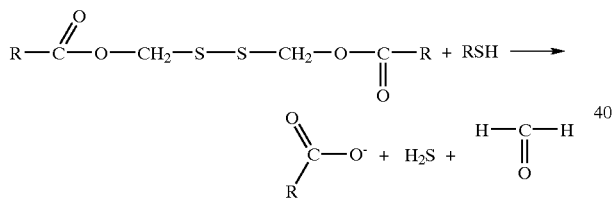

which applies to instant degradable plastics within this family of S—NH, S—O, S—S groups which facilitate instant degradation of such plastic sulfides.

As an additional example of the chemical design used generally in the present invention, the synthesis of special monomers as building units for radical co-polymerization of instant degradable polystyrene is carried out using allyl mercaptan and bezenethiol or allyl mercaptan and chloramine.

The polymer of the present invention can also be used to produce articles which, require durability in the use for which the article is designed, and are not degradable under ambient conditions within the time frame of the useful life of the article. As such, in another aspect of the present invention, the polymer can be used to produce such durable articles. Such articles are, nonetheless, considered to be degradable and are particularly useful because they can be treated to accelerate degradation and therefore, are degradable upon demand. For example, the polymer can be exposed to environmental conditions which accelerate degradation. Thus, it is possible to expose the polymer under mild aqueous conditions, to agents, including but not limited to, mercapto-ethylsulfonic acid at appropriate pH and temperature, in order to induce and enhance dissolution and degradation. The polymers can be exposed to environmental conditions which accelerate degradation, for example, yeast releasing thiolic compounds such as glutathione, or the polymer may be collected into reservoirs with specially prepared aqueous solutions containing reducing agents. It is also possible to expose the polymer under mild conditions, to agents including, but not limited to, mercapto-ethylsulfonic acid to enhance dissolution.

The polymer of the present invention can be characterized as being reductively degradable. As used herein, the term "reductively degradable" refers to a composition in which the disulphide bonds in the molecule are subject to reduction, thus producing smaller molecules.

The polymer of the present invention can be characterized as being hydrolytically degradable. As used herein, the term "hydrolytically degradable" refers to a composition in which chemical bonds in the molecule are subject to hydrolysis, thus producing smaller molecules. In another embodiment of the present invention, the polymer is biodegradable.

The polymer of the present composition may have an average molecular weight of between about 5,000 and about 1,500,000. Appropriate molecular weights will vary according to desired material type as discussed below. The polymer of the present composition can be a homopolymer, a copolymer, or a physical blend of homopolymers and/or polymers. Typically, the polymer of the present materials includes repeating monomer or comonomer units which are selected from the following group and which polymers are non-toxic and degradable:

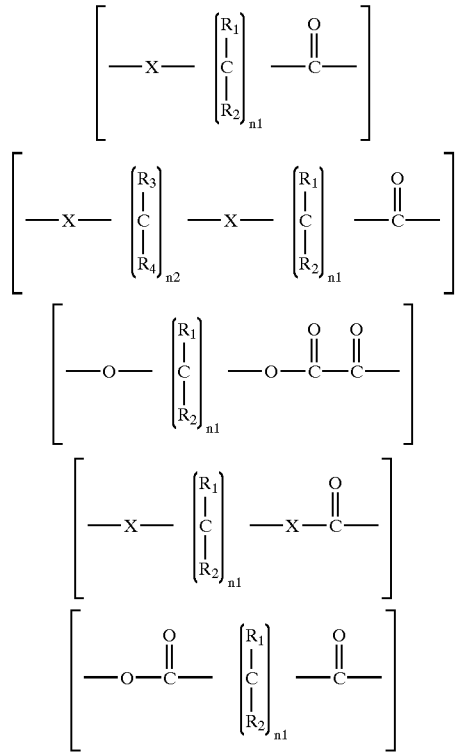

Wherein X is the same or different and is O or NR' with R' independently being H, hydrocarbyl, or substituted hydrocarbyl; $R_1$, $R_2$, $R_3$ and $R_4$ can be the same or different and are hydrogen, hydrocarbyl containing 1 to 24 carbon atoms, or substituted hydrocarbyl containing 1 to 24 carbon atoms, and where n1 and n2 can be the same or different and are an integer of from 1–12.

For ethylene, the polymer comprises repeating monomer or comonomer units derived from CH2=CH2 which have been reacted with the disulphide moiety. Similarly, as shown above in Tables A to C above, the polymer for propene, styrene, vinyl chloride acrylonitrile, and other, comprise of their sulphide derivatives.

In the following examples, the synthesis and processes for degradation of a few embodiments of the invention are described in detail.

6. EXAMPLES

Example 1

Synthesis of Polyurethane 0.1 ml of 2-hydroxyethyldisulphide was mixed with the di-isocyanate monomer: Isophorone Diisocyanate in a volume ratio of 1:1 and in the presence of 1% dibutyltin—dilaureate as catalyst for polymerization of polyurethane. The reaction was allowed to proceed for 3 min. as an exothermic reaction to yield a polyurethane foam. The resulting polyurethane foam was completely insoluble in boiling water for 10 min at 100 C. It dissolved under appropriate controlled reaction conditions with special polymer—degradation—solubility inducing thiol reducing agents, for example, the sodium sale of 0.4 gm mercaptoethylsulfonic acid in 10 ml water at pH 7.0.

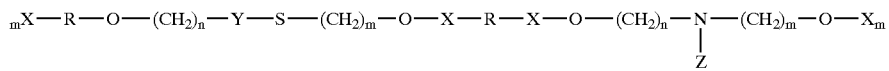

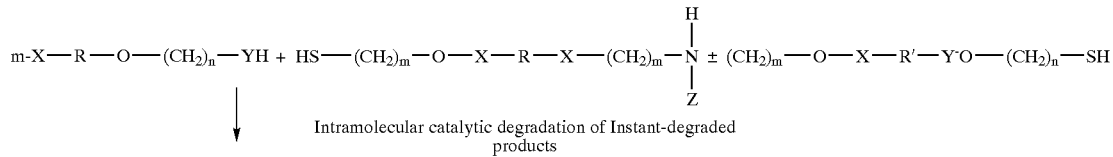

Co-Polymer with Instant-Degradable Qualities

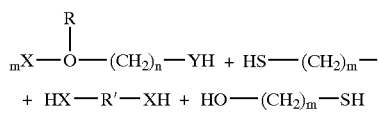

Example 2

Degradation of Polyurethane 0.4 grams of mercaptoethanesulfonic acid sodium salt, 2.4 mmol were dissolved at room temperature in 10 ml water at pH 7.0. The reducing solution was added to 0.4 grams of polyurethane foam and boiled for 15 min at 100 degrees C., The polyurethane disintegrated, lost its rigid structure and dissolved completely in the solution. The control set up showed no degradation.

Example 3

The various steps in the process of the present invention are represented below by a block flow diagram of the pieces of the invention.

Specially Designed Monomers

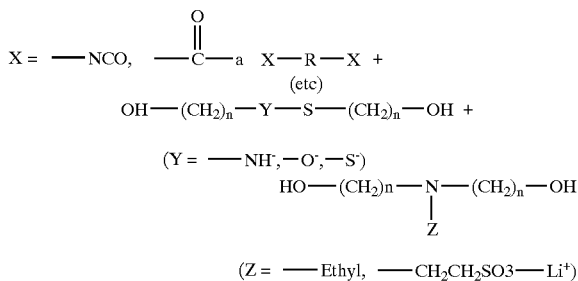

Generic copolymerization under appropriate optional reaction condition (including appropriate catalysts of existing polymer placen) at appropriate manner formulation ratio: Z=ethyl

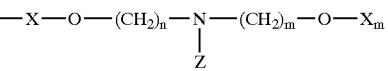

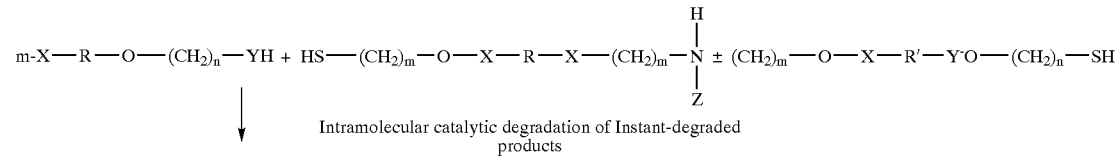

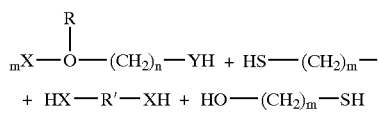

Final Degradation Product Mixtures

Example 4

The copolymerization of monomers taken in appropriate ratios to form the instant degradable co-polyurethane is described below:

Copolymerization at appropriate ratios of monomers to form an Instant-Degradable Co-Polyurethane

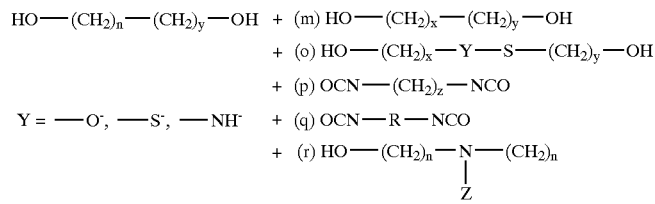

$Y = -O^-, -S^-, -NH^-$

N, m, o, p, q at appropriate Molar ratio $(But)_z Sn(II) (laureate)_2$ [catalyst]
Room temperature (with or without $CH_2Cl_2$)

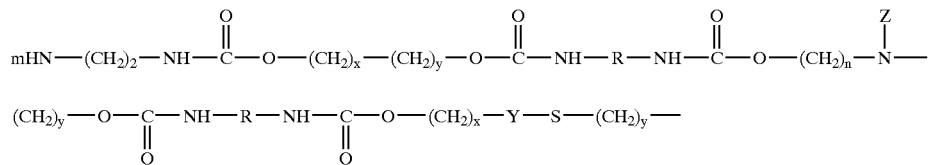

Schematic representation of the preparation of the disulphide plastic product 1. (h) monomer and (p) monomer 9 quite the co-polyurethane product improved solubility upon dissolution in reducing agent solution for instant degradation.—but not under normal aqueous conditions.
2. (m) monomer acquires flexibility properties to mechanical properties of the polymer product.
3. (p) monomer acquires hydrophobic and mechanical properties of the polymer when Z=H; when Z=$SO_3^-$Na$^+$, $SO_3^-$Li$^+$,

solubility qualities are introduced to the Carbon backbone; modifying these ratios between Z=H, and Z=$SO_3^-$

+NH
NH—C—NH— enables to control the overall aqueous and solubility properties or the Instant-Degradable polymer—thus enabling an effective thiol-disulfide cleavage under Appropriate conditions.

Example 5

The degradation process used in the present invention is represented below:

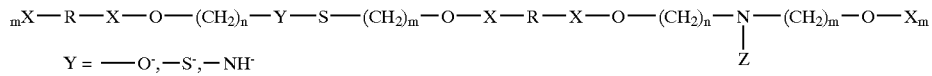

$Y = -O^-, -S^-, -NH^-$

Polymer with latent soluble and disulfide groups

↓ Reducing agent

↓ Hydrolic enzyme
(can also proceed without, since intramolecular R—SH in the degradation product exists and may induce catalyzed hydrolysis)

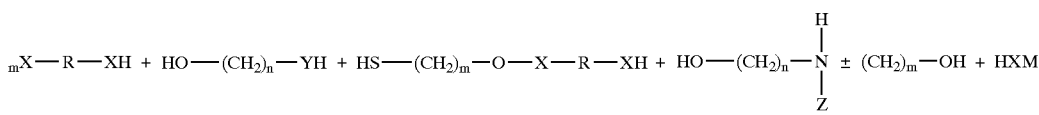

Final Degradation products to be recycled into monomers.

Example 6

The recovery of monomeric units is represented below:
Schematic representation of the recovery of monomeric unit.

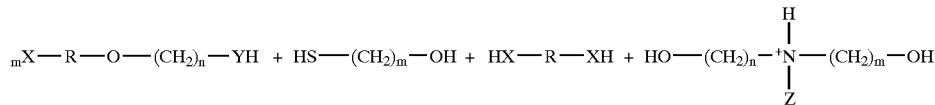

Find Instant Degradation Product Mixture.

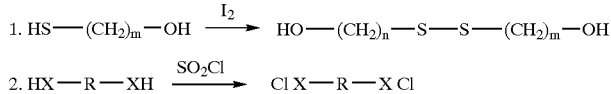

Standard chromatographic Procedures + HX—R—XH + HO—(CH$_2$)$_m$—SH

1. HS—(CH$_2$)$_m$—OH $\xrightarrow{I_2}$ HO—(CH$_2$)$_n$—S—S—(CH$_2$)$_m$—OH

2. HX—R—XH $\xrightarrow{SO_2Cl}$ Cl X—R—X Cl

Recycled Polymeric monomers by the Regular Distillation Processes.

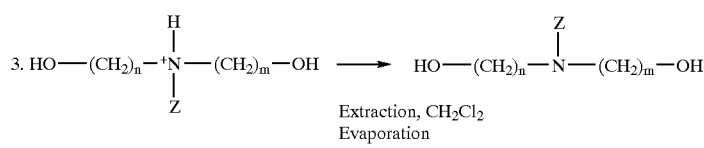

Extraction, CH$_2$Cl$_2$
Evaporation

Example 7

Poly-Epoxy-polymer with instant degradable properties can be dissolved in aqueous Conditions as shown below.
Poly-epoxy-polymer with instant-degradable (latent di-sulphide bonds) (thermoplastic/thermoset) which can be dissolved in the above mentioned conditions

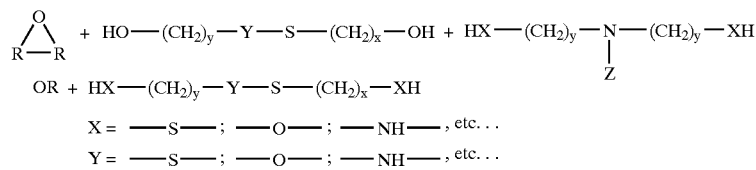

X = —S—; —O—; —NH—, etc...
Y = —S—; —O—; —NH—, etc...

solubility inducing monomeric unit

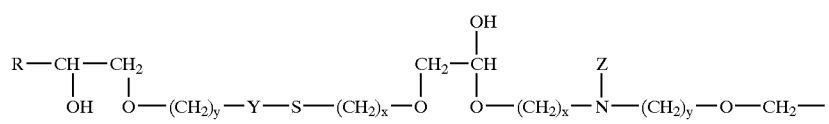

Polyepoxy resin with latent

Example 8

Degradation by chimeric reducing agents as shown below:
Five examples in each group of polymers (synthetic and degradation)

1. Polyurethanes

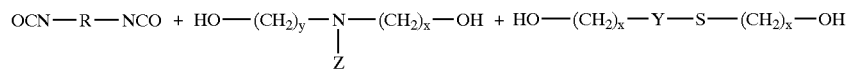

Y = O⁻, S⁻, NH⁻

Synthetics Z

-continued
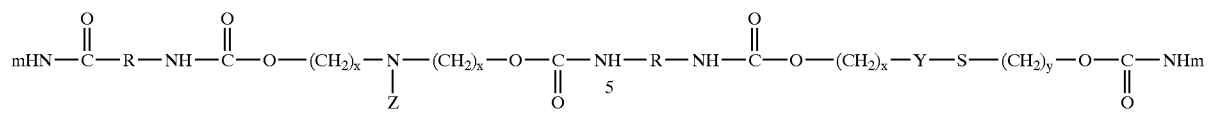
2. Polyesters.
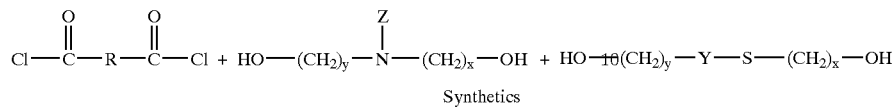
Synthetics
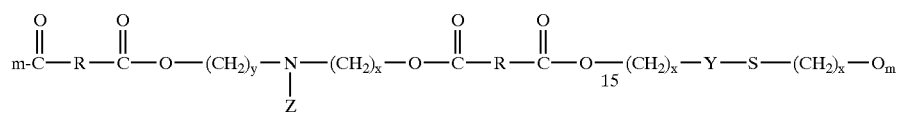
3. Polyadmides
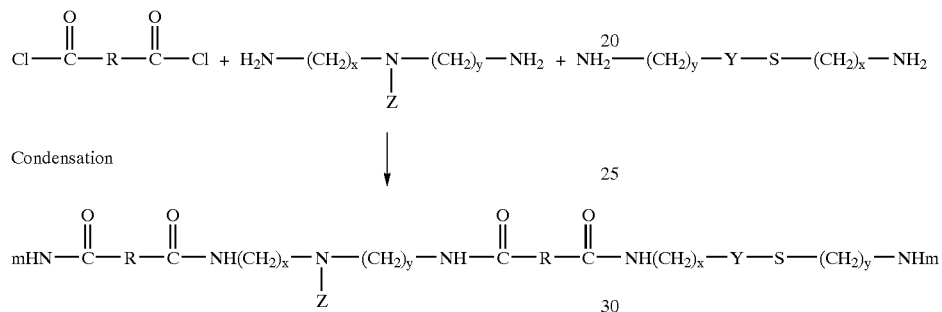
Condensation
4. Polysterenes
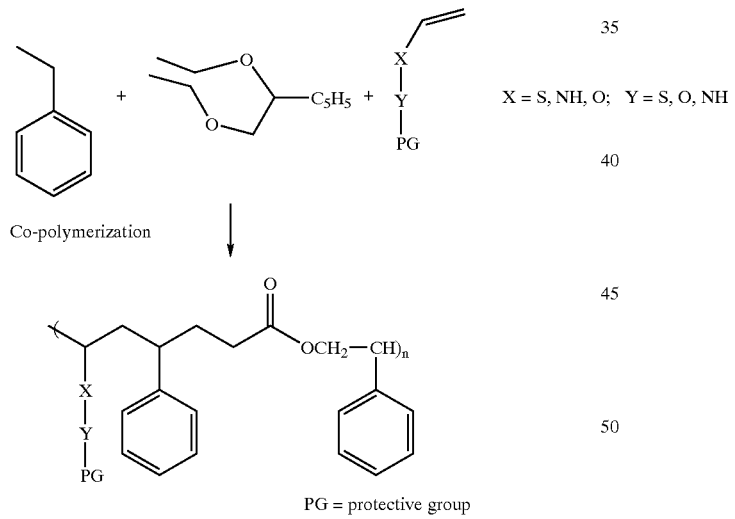
PG = protective group
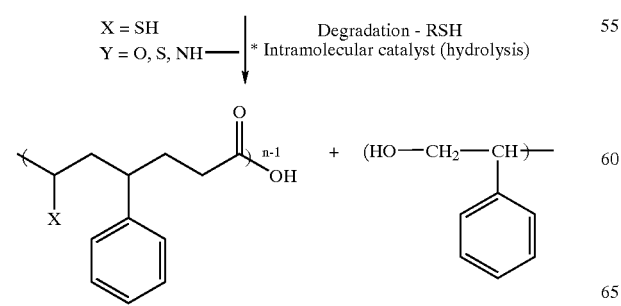

Example 9

A summarized presentation of synthesis and degradation pathways for polyurethanes, Polyesters, polyamides and polystyrenes, as shown below:

Examples for decomposition by chimeric reducing agents.

SH

1. R—SH + HOOC COOH;

HS SO3$^{-NA2}$; H$_3$ $^+$N SH Mercaptosuccinic acid
2. Mercaptosulfonate
3. Mercaptoethyl ammonium
4. 2-Mercapto ethyl triethyl ammonia iodide acetate
5. 2-Mercapto-5-benzimidazde sulfonic acid, seclinn salt dihydrate.
6. Mercaptomethyl imidazole (methimazole)
7. 2-Mercapto-5-methyl-1,3,4-thiadiazde
8. 3-Mercapto-4-methyl-1-A-2,4,-triazole
9. Mercapto-1propane sulfonic acid, sodium salt
10. N-(2-Mercaptopropionyl) glycine
11. 2-Mercapto pyridine Instant degradation of the co-polystyrene polymer is carried out under mild catalytic conditions. After collection of the plastic material in a reservoir container, the de-protection of the latent nucleophilic group is done using a liquid-phase/solid-phase reaction, similar to the concept used in solid-phase peptide synthesis as described in Hansen H J, Anal Biochem 76, 37 (1976), Mery J et al, Int. J. Peptide Protein Res 42, 44 (1993), Hausmann M et al, Ber Bansenges Phys. Chen 99, 853 (1995).

This allows an intramolecular hydrolysis of ester bonds in the co-polystyrene backbone to produce soluble co-polystyrene and low molecular weight monomers of fine chemical commercial interest. This de-protection chemistry is low in cost and gives high yields. Using the ecological approach of soft-chemistry processes, even fermentation and other high technology biotechnological processes can be engineered to produce a variety of commercial products for the co-polystyrene precursors.

Although the present invention is described in connection with particular preferred embodiments and examples, it is to be understood that many modifications and variations can be made in the process and apparatus without departing from the scope to which the inventions disclose herein are entitled. Accordingly it will be understood that these embodiments are illustrative and that the scope of the invention is not limited to them. The present invention is to be considered as including all apparatus, systems and methods encompassed by the appending claims.

What is claimed is:

1. A process for degrading polymers of disulphide plastics, said process comprising adding an effective amount of a reducing agent to the polymers of disulphide plastics, wherein the reducing agent is selected from a group having a thiol group and consisting of 6-mercaptoguanosine; 8-mercaptoguanosine; 2(R)-2-mercaptomethyl-4-methylpentanoyl-B-(-2naphthyl)-ala-ala-amide; (2R)-2-mercaptomethyl-4-methylpentanoyl-phe-ala-amide; N-(2-mercaptopropionyl)-glycine; 2-mercaptopurine; 6-mercaptopurine; 6-mercaptopurine-2'-deoxy-riboside; 6 mercaptopurine riboside; and B-mercaptovaline.

2. A process for degrading polymers of disulphide plastics, said process comprising adding to the disulphide plastics, an effective amount of a reducing agent having a thiol group and for facturing the chemical bonds in said plastics and producing a variety of monomers and degradation products wherein, said reducing agent is selected from the group consisting of 6-mercaptoguanosine; 8-mercaptoguanosine; 2(R)-2-mercaptomethyl-4-methylpentanoyl-B-(-2naphthyl)-ala-ala-amide; (2R)-2-mercaptomethyl-4-methylpentanoyl-phe-ala-amide; N-(2-mercaptopropionyl)-glycine; 2-mercaptopurine; 6-mercaptopurine; 6-mercaptopurine-2'-deoxy-riboside; 6-mercaptopurine riboside; and B-mercaptovaline; and wherein, the polymers comprise subunits including the amino-sulfenyl group, the oxygen-sulfenyl group or the disulphide group.

* * * * *